April 20, 1948.   D. S. GREY   2,440,088
OPTICAL LENS SYSTEM
Filed April 22, 1943

FIG. 1

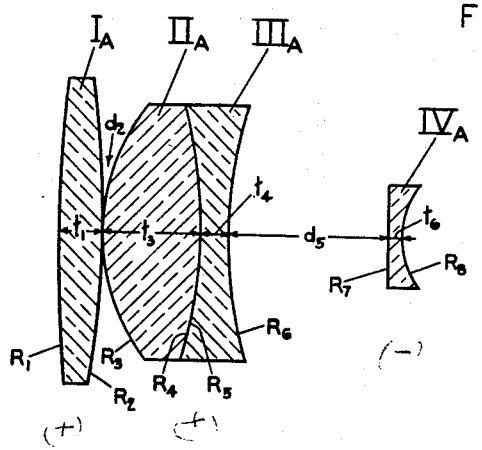

| LENS | RADIUS | THICKNESS | $N_D$ | V |
|---|---|---|---|---|
| $I_A$ | $R_1 = +302.8$ | $t_1 = 8.1$ | 1.506 | 57 |
|  | $R_2 = -192.7$ | $d_2 = 0.0$ |  |  |
| $II_A$ | $R_3 = +40.0$ | $t_3 = 19.4$ | 1.506 | 57 |
|  | $R_4 = -90.0$ |  |  |  |
| $III_A$ | $R_5 = -90.0$ | $t_4 = 5.4$ | 1.591 | 31 |
|  | $R_6 = +85.7$ | $d_5 = 31.5$ |  |  |
| $IV_A$ | $R_7 = \infty$ | $t_6 = 3.0$ | 1.506 | 57 |
|  | $R_8 = +16.4$ |  |  |  |

FIG. 2

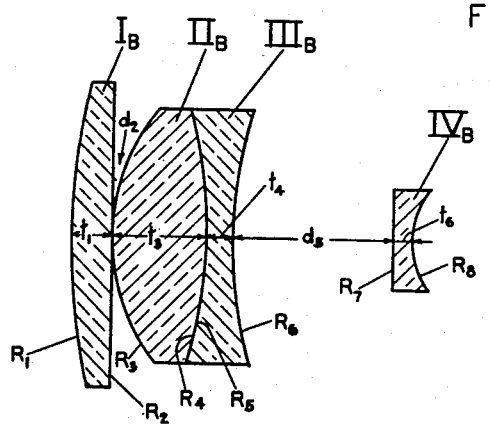

| LENS | RADIUS | THICKNESS | $N_D$ | V |
|---|---|---|---|---|
| $I_B$ | $R_1 = +128.6$ | $t_1 = 8.1$ | 1.506 | 57 |
|  | $R_2 = \infty$ | $d_2 = 0.0$ |  |  |
| $II_B$ | $R_3 = +39.1$ | $t_3 = 18.9$ | 1.506 | 57 |
|  | $R_4 = -90.0$ |  |  |  |
| $III_B$ | $R_5 = -90.0$ | $t_4 = 5.4$ | 1.591 | 31 |
|  | $R_6 = +85.7$ | $d_5 = 31.5$ |  |  |
| $IV_B$ | $R_7 = \infty$ | $t_6 = 4.05$ | 1.506 | 57 |
|  | $R_8 = +16.4$ |  |  |  |

FIG. 3

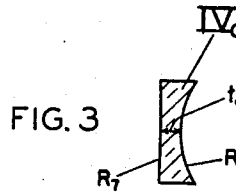

| LENS | RADIUS | THICKNESS | $N_D$ | V |
|---|---|---|---|---|
| $IV_C$ | $R_7 = -300.0$ | $t_6 = 4.05$ | 1.550 | 45 |
|  | $R_8 = +18.6$ |  |  |  |

David S. Grey
INVENTOR.

BY Donald L. Brown
Attorney

Patented Apr. 20, 1948

2,440,088

UNITED STATES PATENT OFFICE 2,440,088

OPTICAL LENS SYSTEM

David S. Grey, Cambridge, Mass., assignor to Polaroid Corporation, Cambridge, Mass., a corporation of Delaware Application April 22, 1943, Serial No. 484,000

12 Claims. (Cl. 88—57)

This invention relates to lens systems and more particularly to an arrangement of lenses adapted for use in a telescope.

One object of the invention is to provide a novel Galilean telescope having a full apparent field of view which is approximately 1⅓ times as great as that of the highest grade conventional Galilean telescopes of equivalent power, and twice as great as that of ordinary Galilean telescopes of equivalent power.

Another object is to provide a novel telescope of the above character which is satisfactorily corrected for spherical aberration, coma, curvature of field, distortion, and astigmatic difference.

A still further object is to provide a novel telescopic lens system comprising a plurality of components of organic resin wherein power and correction, which compare favorably with those of a corresponding system of optical glass, are obtained at a considerable reduction in cost of manufacture.

These and other objects and novel features of this invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

In the drawings, Figs. 1 and 2 are diagrammatic views illustrating two embodiments of the lens system comprehended by the present invention and setting out the constructional data for said embodiments, and Fig. 3 is a similar view of an alternate form of eyepiece which may be used, for example, in the system of Fig. 2.

In the form illustrated, in all the views, the Galilean telescope of the present invention consists of an objective lens comprising three components I, II, III, and an eyepiece, preferably of a single element IV. While corresponding elements of the several embodiments shown in the drawings are distinguished by the subscripts A, B, and C, it is to be understood that reference made hereinafter to said elements by said numerals without the subscripts relates generically to all of the systems illustrated.

Eyelens IV may be formed from any suitable optical material having an Abbé dispersive index or nu value $$\left(\frac{N_D-1}{N_F-N_C}\right)$$

greater than 45, and is preferably formed from the crown material of the objective, as for example, cyclohexyl methacrylate, which has a nu value of approximately 57 and an index of refraction of approximately 1.506. The power of said lens is selected to give the magnification desired which is preferably no greater than 3½ for the illustrated objectives. Most eye lenses of the type used in Galilean telescopes are equi-concave, and while the latter type could be adapted for utility with the objective of the present invention, best results are obtained with an eyepiece having the radius $R_7$ of the surface adjacent the objective five or more times that of the radius $R_8$ of the other surface. In the preferred forms of the lens system, eye lens IV is plano-concave thereby providing a relatively simple lens construction as compared to the eye lenses of most prior art Galilean telescopes. An alternative form of eyepiece IVc shown in Fig. 3, which may be utilized, for example, in the embodiment of Fig. 2, comprises a bi-concave lens of a suitable material, such as crown flint glass, having a dispersive index of approximately 45 and an index of refraction of approximately 1.55.

In the form shown, the crown of the objective comprises positive lenses I and II which are in contact and are only as thick as is necessary to achieve the desired curvatures and effective diameters. Lens I preferably has a focal length about four times that of lens II, and for Galilean telescopes having relatively small field angles, may be plano-concave with the surface toward the eye plane, for example as shown in Fig. 2. However, to improve the corrections in the outer margins of the field when the largest possible field of view is desired, the lens may be bent forward, i. e., away from the eye, as much as to have the radius $R_2$ of the surface toward the eye ½ of the radius $R_1$ of the outer surface (Fig. 1). Lens II is formed to have approximately four times the power of lens I, and lens III, which is preferably cemented to lens II, is approximately equi-concave although satisfactory results are obtained if either radius thereof is not greater than 1.2 times the other. Lens III has its power selected to eliminate longitudinal chromatic aberration in the complete telescopic system when, as in the preferred embodiments of the invention, an unachromatized crown eyelens is used. Residual variation of magnification with color then very nearly balances variation of distortion with color.

Each of lens elements I, II, and III of the objective is preferably formed from an organic resin or plastic, and a satisfactory resin for the crown material is cyclohexyl methacrylate, which has an index of refraction ($N_D$) of approximately 1.506 and a nu value or reciprocal dispersion (V) of approximately 57. For the flint material, it is preferable to employ styrene which has an index of refraction ($N_D$) of approximately 1.591 and a nu value (V) of approximately 31. While the said materials are preferred, other resins or optical glasses having a large difference in reciprocal dispersions, for example, of the order of 18 or greater, and a difference in indices of refraction of 0.1 to 0.05 with the flint having the higher index of refraction may be employed in accordance with the invention as will now be apparent to those skilled in the art.

The tables below relate to the lens system illustrated in the drawing and are numbered to correspond with the numbering of the figures in the drawing.

The column "Radius" of the tables refers to the radii of the spherical surfaces as measured in linear units, for example, millimeters. The column designated "Thickness" refers to the thickness of the lenses, also the air gaps between lenses, as measured on the axis of the lens system, in the same linear units as those used to measure the "Radius." The letter "$t$" indicates lens thickness and the letter "$d$" air spaces.

The term "$N_D$" is used to designate the index of refraction of the materials for the lenses as measured for the yellow "D" line of a sodium arc.

The column "V" designates the nu value or reciprocal dispersion, for the lens materials used.

Example I

The embodiment of the invention illustrated in Fig. 1 comprises elements possessing the following properties:

| Lens | Radius | Thickness | $N_D$ | V |
|---|---|---|---|---|
| $I_A$ | $R_1 = +302.8$ | $t_1 = 8.1$ | 1.506 | 57 |
|  | $R_2 = -192.7$ | $d_2 = 0$ |  |  |
| $II_A$ | $R_3 = +40.0$ | $t_3 = 19.4$ | 1.506 | 57 |
|  | $R_4 = -90.0$ |  |  |  |
| $III_A$ | $R_5 = -90.0$ | $t_4 = 5.4$ | 1.591 | 31 |
|  | $R_6 = +85.7$ | $d_5 = 31.5$ |  |  |
| $IV_A$ | $R_7 = \infty$ | $t_6 = 3.0$ | 1.506 | 57 |
|  | $R_8 = +16.4$ |  |  |  |

The above embodiment has a true field of 13°, an apparent field of 38°, and a magnification of approximately 2.9.

Example II

The embodiment of the invention illustrated in Fig. 1 comprises elements possessing the following properties:

| Lens | Radius | Thickness | $N_D$ | V |
|---|---|---|---|---|
| $I_B$ | $R_1 = +128.6$ | $t_1 = 8.1$ | 1.506 | 57 |
|  | $R_2 = \infty$ | $d_2 = 0$ |  |  |
| $II_B$ | $R_3 = +39.10$ | $t_3 = 18.9$ | 1.506 | 57 |
|  | $R_4 = -90.00$ |  |  |  |
| $III_B$ | $R_5 = -90.00$ | $t_4 = 5.4$ | 1.591 | 31 |
|  | $R_6 = +85.70$ | $d_5 = 31.5$ |  |  |
| $IV_B$ | $R_7 = \infty$ | $t_6 = 4.05$ | 1.506 | 57 |
|  | $R_8 = +16.40$ |  |  |  |

The above embodiment has a true field of 12°, an apparent field of 35°, and a magnification of approximately 2.9.

Both of the above lens systems show sharp definition over the entire field except for lateral color. The latter is balanced against variations of magnification with color so as to be unobjectionable.

It is to be understood that $d_5$, i. e., the air space between lenses III and IV, is adjusted to focus so that the distances specified therefor are approximate, average values.

Example III

The eyelens of the embodiment shown in Fig. 2, and just described, may be modified as heretofore mentioned. One such modification, for use with the remainder of the optical system of Fig. 2, is illustrated in Fig. 3 and may be described as follows:

| Lens | Radius | Thickness | $N_D$ | V |
|---|---|---|---|---|
| $IV_C$ | $R_7 = -300.0$ | $t_6 = 4.05$ | 1.55 | 45 |
|  | $R_8 = +18.60$ |  |  |  |

In the above embodiments of the invention Galilean telescopes are provided wherein the second glass-air surface in the objective is not curved towards the eye; wherein the objective is partially achromatized by a negative lens which preferably consists of a single element, and preferably forms a cemented doublet with one of the positive object lenses; wherein the power of said negative lens is selected to eliminate longitudinal chromatic aberration in the complete system; wherein the arrangement of lenses causes residual variation of magnification with color very nearly to balance variation of distortion with color; wherein the eyepiece has its strongest curve toward the eye and may have the inner surface thereof plano; whereby an exceptionally large apparent field of view is obtained; and wherein spherical aberration, coma, curvature of field, distortion and astigmatic difference are satisfactorily corrected. The novel lens system can be constructed of lens components having the optical properties, such as indices of refraction and dispersive indices, available in organic resins and plastics.

Since certain changes in the constructions set forth which embody the invention may be made without departing from its scope, it is intended that all matter contained in the foregoing description, or shown in the accompanying drawings, shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a Galilean telescope, a lens system having a wide angle of view and comprising an objective lens having an outer positive lens of crown material possessing a convex outer surface and a convex to plano inner surface and having a focal length of from two to three times that of the objective, the radius of curvature of the inner surface being greater than one-half the radius of curvature of said outer surface when said inner surface is convex, a second positive lens of crown material substantially in contact with said first lens and having a focal length of approximately one-quarter the focal length of the first-named lens, and a negative bi-concave lens of flint material forming a single lens element with said second lens and adapted to achromatize the entire telescope system, said last named lens having the radius of curvature of either surface thereof not greater than 1.2 times the radius of curvature of the other surface thereof.

2. In a Galilean telescope, a lens system having a wide angle of view and comprising an objective lens having an outer positive lens of crown material possessing a convex outer surface and a convex to plano inner surface and having a focal length of from two to three times that of the objective, the radius of curvature of the inner surface being greater than one-half the radius of curvature of said outer surface when said inner surface is convex, a second positive lens of crown material substantially in contact with said first lens and having a focal length of approximately one-quarter the focal length of the first-named lens, and a negative bi-concave lens of flint material forming a single lens element with said second lens and adapted to achromatize the entire telescope system, said last named lens having the radius of curvature of either surface thereof not greater than 1.2 times the radius of curvature of the other surface thereof and an eyelens consisting of a single element which has a concave outer surface and an inner surface of a radius of curvature not less than five times that of said outer surface said eyelens having a focal length equal to the focal length of the objective divided by the magnification of the telescope.

3. In a Galilean telescope, a lens system having a wide angle of view and comprising an objective lens having an outer positive lens of crown material possessing a convex outer surface and a convex to plano inner surface and having a focal length of from two to three times that of the objective, the radius of curvature of the inner surface being greater than one-half the radius of curvature of said outer surface when said inner surface is convex, a second positive lens of crown material substantially in contact with said first lens and having a focal length of approximately one-quarter the focal length of the first-named lens, and a negative bi-concave lens of flint material forming a single lens element with said second lens and adapted to achromatize the entire telescope system, said last named lens having the radius of curvature of either surface thereof not greater than 1.2 times the radius of curvature of the other surface thereof and an eyelens of the same crown material as said positive lenses, said eyelens consisting of a single element which has a concave outer surface and an inner surface of a radius of curvature not less than five times that of said outer surface, said eyelens having a focal length equal to the focal length of the objective divided by the magnification of the telescope.

4. In a Galilean telescope, a lens system having a wide angle of view and comprising an objective lens having an outer positive lens of crown material possessing a convex outer surface and a convex to plano inner surface and having a focal length of from two to three times that of the objective, the radius of curvature of the inner surface being greater than one-half the radius of curvature of said outer surface when said inner surface is convex, a second positive lens of crown material substantially in contact with said first lens and having a focal length of approximately one-quarter the focal length of the first-named lens, and a negative bi-concave lens of flint material forming a single lens element with said second lens and adapted to achromatize the entire telescope system, said last named lens having the radius of curvature of either surface thereof not greater than 1.2 times the radius of curvature of the other surface thereof and an eyelens of the same crown material as said positive lenses, said eyelens consisting of a single element which has a concave outer surface and an inner surface of a radius of curvature not less than five times that of said outer surface, said crown material and said flint material having a difference in indices of refraction between 0.1 and 0.05 and a difference in nu values greater than 18, with the flint material having the higher index of refraction, said eyelens having a focal length equal to the focal length of the objective divided by the magnification of the telescope.

5. In a telescope lens system of the character described, an objective lens comprising an outer positive lens of cyclohexyl methacrylate having a convex outer surface and a convex to plano inner surface and having a focal length of from two to three times that of the objective, the radius of curvature of the inner surface being greater than one-half the radius of curvature of said outer surface when said inner surface is convex, a second positive lens of cyclohexyl methacrylate substantially in contact with said first lens and having a focal length of approximately one-quarter the focal length of the first-named lens, and a negative bi-concave lens of styrene forming a single lens element with said second lens and adapted to achromatize the entire telescope system, said last named lens having the radius of curvature of either surface thereof not greater than 1.2 times the radius of curvature of the other surface thereof.

6. In a telescope lens system of the character described, an objective lens comprising an outer positive lens of cyclohexyl methacrylate having a convex outer surface and a convex to plano inner surface and having a focal length of from two to three times that of the objective, the radius of curvature of the inner surface being greater than ½ the radius of curvature of said outer surface when said inner surface is convex, a second positive lens of cyclohexyl methacrylate substantially in contact with said first lens and having a focal length of approximately one-quarter the focal length of the first-named lens, and a negative bi-concave lens of styrene forming a single lens element with said second lens and adapted to achromatize the entire telescope system, said last-named lens having the radius of curvature of either surface thereof not greater than 1.2 times the radius of curvature of the other surface thereof, and a negative eyelens of cyclohexyl methacrylate consisting of a single component which has a concave outer surface adjacent the eye and its other surface concave to plano and of a radius of curvature greater than five times that of said surface adjacent the eye, said eyelens having a focal length equal to the focal length of the objective divided by the magnification of the telescope.

7. A lens system of the character described comprising two axial components, the first of which consists of three elements substantially in contact and constitutes an objective lens, and the second of which consists of a single element and constitutes an eyelens, and having substantially the numerical data set forth in the following table wherein I, II, III, and IV designate the successive lens elements, $R_1$—$R_8$ designate the radii of the surfaces thereof, $t_1$, $t_3$, $t_4$, and $t_6$ designate the thicknesses thereof, the column $N_D$ designates the indices of refraction thereof, and the column V designates the Abbé dispersive indices or nu values thereof:

| Lens | Radius | Thickness | $N_D$ | V |
|---|---|---|---|---|
| I | $R_1 = +302.8$ | $t_1 = 8.1$ | 1.506 | 57 |
|   | $R_2 = -192.7$ |             |       |    |
| II | $R_3 = +40.0$ | $t_3 = 19.4$ | 1.506 | 57 |
|    | $R_4 = -90.0$ |              |       |    |
| III | $R_5 = -90.0$ | $t_4 = 5.4$ | 1.591 | 31 |
|     | $R_6 = +85.7$ |             |       |    |
| IV | $R_7 = \infty$ | $t_6 = 3.0$ | 1.506 | 57 |
|    | $R_8 = +16.4$  |             |       |    |

8. A lens system of the character described comprising two axial components, the first of which consists of three elements substantially in contact and constitutes an objective lens, and the second of which consists of a single element and constitutes an eyelens, and having substantially the numerical data set forth in the following table wherein I, II, III, and IV designate the successive lens elements, $R_1$–$R_8$ designate the radii of the surfaces thereof $t_1$, $t_3$, $t_4$, and $t_6$ designate the thicknesses thereof, the column $N_D$ designates the indices of refraction thereof, and the column V designates the Abbé dispersive indices or nu values thereof:

| Lens | Radius | Thickness | $N_D$ | V |
|---|---|---|---|---|
| I | $R_1 = +128.6$ | $t_1 = 8.1$ | 1.506 | 57 |
|   | $R_2 = \infty$ |             |       |    |
| II | $R_3 = +39.10$ | $t_3 = 18.9$ | 1.506 | 57 |
|    | $R_4 = -90.00$ |              |       |    |
| III | $R_5 = -90.00$ | $t_4 = 5.4$ | 1.591 | 31 |
|     | $R_6 = +85.70$ |             |       |    |
| IV | $R_7 = \infty$ | $t_6 = 4.05$ | 1.506 | 57 |
|    | $R_8 = +16.40$ |              |       |    |

9. A lens system of the character described comprising two axial components, the first of which consists of three elements substantially in contact and constitutes an objective lens, and the second of which consists of a single element and constitutes an eyelens, and having substantially the numerical data set forth in the following table wherein I, II, III and IV designate the successive lens element, $R_1$–$R_8$ designate the radii of the surfaces thereof, $t_1$, $t_3$, $t_4$ and $t_6$ designate the thicknesses thereof, the column $N_D$ designates the indices of refraction thereof, and the column V designates the Abbé dispersive indices or nu values thereof:

| Lens | Radius | Thickness | $N_D$ | V |
|---|---|---|---|---|
| I | $R_1 = +128.6$ | $t_1 = 8.1$ | 1.506 | 57 |
|   | $R_2 = \infty$ |             |       |    |
| II | $R_3 = +39.10$ | $t_3 = 18.9$ | 1.506 | 57 |
|    | $R_4 = -90.00$ |              |       |    |
| III | $R_5 = -90.00$ | $t_4 = 5.4$ | 1.591 | 31 |
|     | $R_6 = +85.70$ |             |       |    |
| IV | $R_7 = -300.0$ | $t_6 = 4.05$ | 1.55 | 45 |
|    | $R_8 = +18.60$ |              |      |    |

10. In a Galilean telescope, a lens system having a wide angle of view and comprising an objective lens having an outer positive lens of crown material possessing a convex outer surface and a convex to plano inner surface and having a focal length of from two to three times the focal length of the objective as a whole, the radius of curvature of said inner surface being greater than one-half the radius of curvature of said outer surface when said inner surface is convex, a second positive lens of crown material substantially in contact with said first lens and having a focal length of approximately one-quarter the focal length of the first lens, and a negative bi-concave lens of flint material forming a single element with said second lens and adapted to achromatize the entire telescope system, said last-named lens having the radius of curvature of either surface thereof not greater than 1.2 times the radius of curvature of the other surface thereof, and said crown and flint material having a difference in indices of refraction between 0.1 and 0.05 and a difference in nu values greater than 18 with the flint material having the higher index of refraction.

11. In a Galilean telescope having an objective lens comprising an outer positive singlet and an axially aligned positive doublet substantially in contact therewith, a focal length for said singlet of from two to three times the focal length of the objective as a whole, said singlet being formed of crown material and having its outer surface convex and its inner surface from convex to plano, the radius of curvature of the inner surface of the singlet being greater than one-half the radius of curvature of the outer surface when the inner surface is convex.

12. In a Galilean telescope having an objective lens comprising an outer positive singlet and an axially aligned positive doublet substantially in contact therewith, a focal length for said singlet of approximately 2.5 times the focal length of the objective as a whole, said singlet being formed of crown material and having its outer surface convex and its inner surface from convex to plano, the radius of curvature of the inner surface of the singlet being greater than one-half the radius of curvature of the outer surface when the inner surface is convex.

DAVID S. GREY.

REFERENCES CITED

The following references are of record in the file of this patent:

UNITED STATES PATENTS

| Number | Name | Date |
|---|---|---|
| 962,920 | Van Rohr | June 28, 1910 |
| 1,937,323 | Meher et al. | Nov. 28, 1933 |
| 1,980,483 | Hill | Nov. 13, 1934 |
| 2,057,674 | Fields | Oct. 20, 1936 |
| 2,176,837 | Ellis | Oct. 17, 1939 |
| 2,193,742 | Rohm et al. | Mar. 12, 1940 |
| 2,254,440 | Moulton | Sept. 2, 1941 |
| 2,314,838 | Kingston | Mar. 23, 1943 |

FOREIGN PATENTS

| Number | Country | Date |
|---|---|---|
| 490,381 | Great Britain | Aug. 15, 1938 |